United States Patent [19]

Skrentner

[11] 4,173,159
[45] Nov. 6, 1979

[54] TRANSFER MECHANISM AND METHOD

[75] Inventor: Frank C. Skrentner, Bloomfield Hills, Mich.

[73] Assignee: F. Jos. Lamb Company, Warren, Mich.

[21] Appl. No.: 907,000

[22] Filed: May 18, 1978

[51] Int. Cl.² .......................... B23B 3/00; B23B 13/00
[52] U.S. Cl. ......................................... 82/1 C; 82/2.5; 82/3
[58] Field of Search ........................ 82/2.5, 2.7, 3, 1 C

[56] References Cited

U.S. PATENT DOCUMENTS

| | | | |
|---|---|---|---|
| 522,930 | 7/1894 | Church | 82/3 X |
| 3,179,964 | 4/1965 | Grundy | 82/2.7 |

FOREIGN PATENT DOCUMENTS 803434 10/1958 United Kingdom ...................... 82/2.5

*Primary Examiner*—Harrison L. Hinson
*Attorney, Agent, or Firm*—Barnes, Kisselle, Raisch & Choate

[57] ABSTRACT

A workpiece transfer machine of the type including a plurality of regularly spaced machining stations is disclosed. Workpieces are advanced to the successive machining stations by means of a transfer bar powered to have a rectangular walking beam motion. The transfer bar is provided with nests or carriers for supporting the workpieces and is adapted to be retracted and remain in a position wherein the nests are located midway between the machining stations while the workpieces are being machined.

12 Claims, 11 Drawing Figures

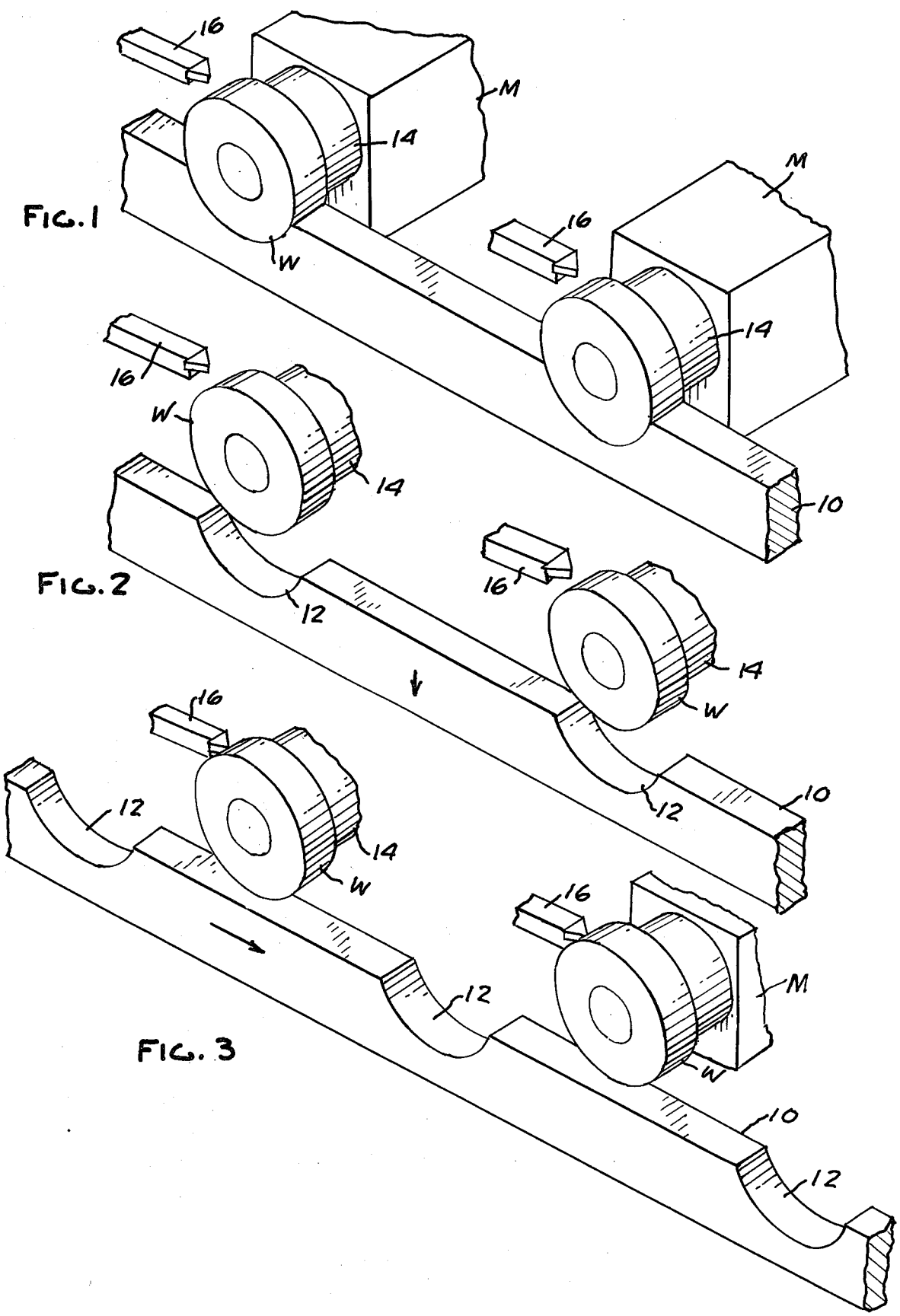

TRANSFER MECHANISM AND METHOD

This invention relates to a workpiece transfer mechanism of the type wherein the transfer bar is of the lift and carry type.

It is common practice in machining workpieces to index the workpieces through a series of stations of a transfer machine wherein successive machining operations are performed. In one type of transfer machine of this type the workpieces are supported in nests or carriers on the transfer bar and the transfer bar has imparted to it a walking beam motion. The transfer bar is first advanced to locate the workpieces at a position where they are adapted to be operated on by the machine tools, then lowered to an out-of-the-way position while the workpieces are being machined, then retracted through a stroke equal to the distance between successive stations and then raised to again interengage the workpieces with the nests on the transfer bar for the next transfer stroke to index the workpieces to the next successive stations.

One of the problems encountered in this type of system is that, while the pieces are being machined, the nests or carriers are located directly below the workpieces and tend to fill with chips. This accumulation of chips will interfere with the proper location of the workpieces when the transfer bar is raised for the next transfer stroke. While a shield or cover placed over the nest during the machining operation might solve this problem in some instances, due to the limitation of space caused by the proximity of machine elements and the requirement that the shields have to be completely removed to clear both the transfer bar when it is being raised and the workpiece while it is being transferred, the use of such shields is in most instances impractical.

It is the object of the present invention to provide a transfer bar mechanism of the lift and carry type wherein accumulation of machining chips in the workpiece nests on the transfer bar is avoided.

A further object of the invention is to eliminate the accumulation of chips in the workpiece nests of a transfer bar of the lift and carry type by causing the bar on its retraction stroke to return to a position wherein the workpiece nests are located approximately half way between the successive machining stations. When the transfer bars are returned through a half stroke the workpiece nests are located generally out of the path of the falling chips, and, after the machining operation is completed, the transfer bar is returned the remaining half stroke where it is again raised to receive the workpiece.

Other objects, features and advantages of the present invention will become apparent from the following description and accompanying drawings, in which:

FIG. 1 is a somewhat diagrammatic view of a transfer bar arrangement in accordance with the present invention showing the transfer bar in the raised position at the forward end of its stroke;

FIG. 2 shows the transfer bar lowered while in its forward position;

FIG. 3 shows a transfer bar returned to a position wherein the workpiece nests are disposed approximately half way between successive stations;

Figure 5:
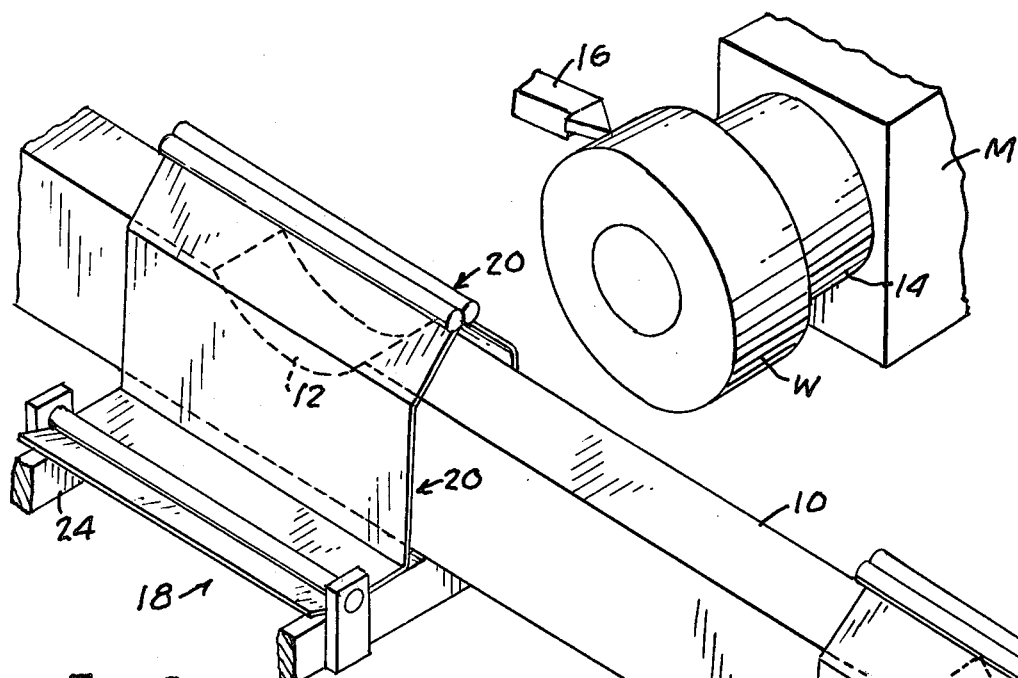
FIG. 5 shows the transfer bar arrangement illustrated in FIG. 4 in the lowered retracted position wherein the workpiece nests are disposed approximately midway between successive machining stations.

In FIG. 1 there is illustrated a transfer bar 10 on which a plurality of workpieces W are supported in workpiece nests 12. A plurality of machining stations M are spaced along transfer bar 10 at regular intervals. In the arrangement shown each machining station M has a spindle 14 adapted to chuck the workpieces when they are axially aligned with the spindle. At each machining station there is a cutting tool 16 machining the workpieces chucked in the spindles 14. The workpiece nests 12 on transfer bar 10 are spaced apart in accordance with the spacing between successive machining stations M.

The arrangement illustrated in FIGS. 1 through 3 is somewhat diagrammatic. In actual practice and depending upon the shape of the workpiece and the machining operation to be performed, two interconnected, parallel transfer bars may be employed, the nests 12 may either be formed directly on the transfer bar as illustrated or may be in the form of carriers supported for movement with the transfer bar as a separate sub-assembly. Furthermore, in practice the workpieces may be deposited by the transfer bar on stationary support rails located adjacent each of the machining stations rather than being chucked by spindles on the machine while the workpieces are supported by the transfer bar.

Regardless of the specific construction of the transfer bar, the workpiece nests 12 and the nature of the machining stations, in accordance with the present invention the transfer bar has imparted to it a stroke such that, while the workpieces are being machined, the nests 12 are located intermediate the successive machining stations so that the machining chips will not accumulate in the nests. In FIG. 1 the transfer bar 10 is illustrated in its raised position at the forward end of its stroke wherein the workpieces are chucked in the spindles 14. After the workpieces have been properly located relative to the machining stations the transfer bar is lowered as shown in FIG. 2. Thereafter the transfer bar is retracted through a half stroke so that the nests 12 are located approximately midway between the successive machining stations. With the transfer bar located in the position shown in FIG. 3 the cutting tools 16 can be operated to produce the desired machining operation on the workpieces. After the machining operation is completed the transfer bar is retracted the remaining half stroke as indicated by the arrow in FIG. 3 to a position wrein the workpiece nests 12 are again in alignment with the workpieces at the next station. The transfer bar can then be raised to pick up the workpieces and then advanced forwardly (to the left as viewed in the drawings) through its full stroke to position each of the workpieces at the next successive station.

Figure 4:
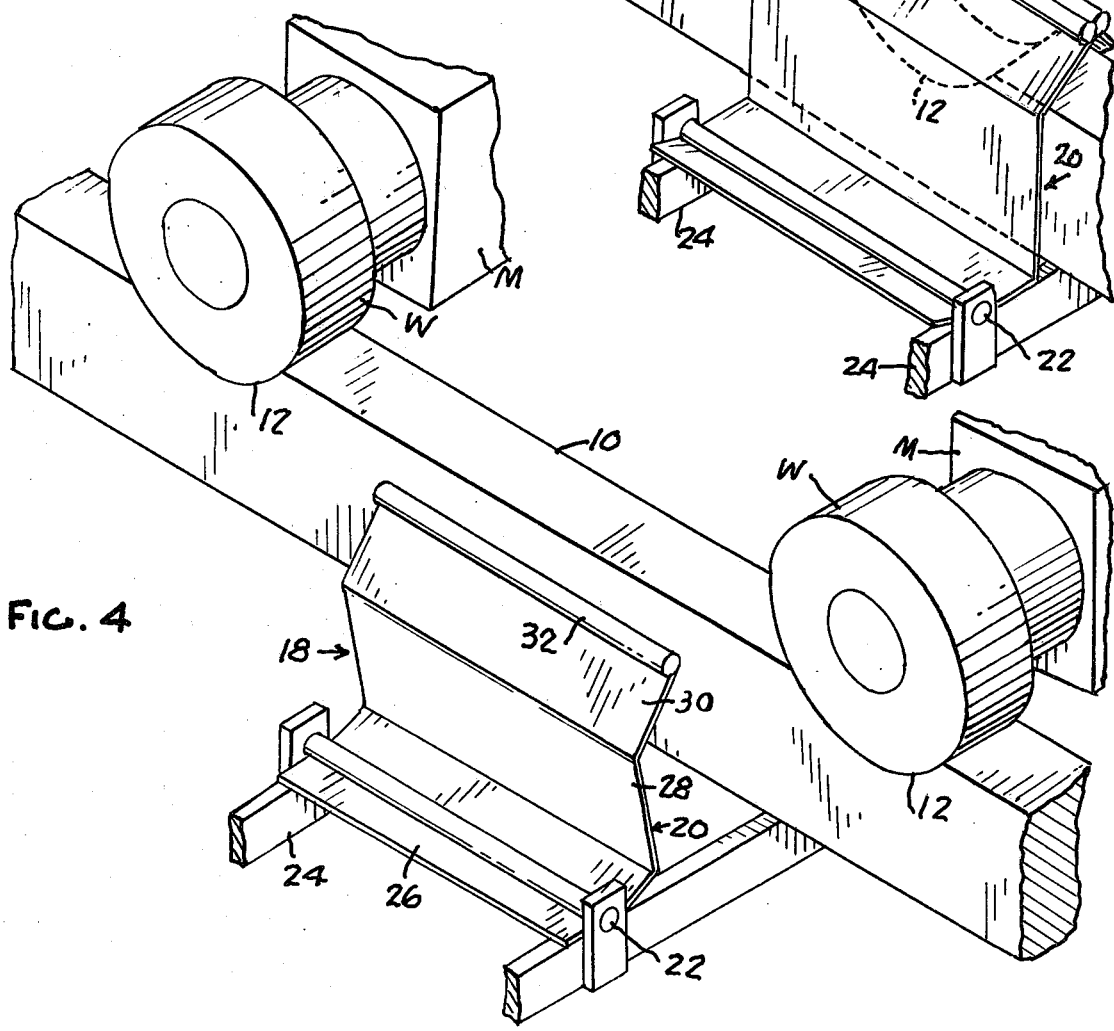
FIG. 4 shows a transfer bar according to the present invention in the raised position at the forward end of its stroke with shields located at positions intermediate the successive machining stations.

FIGS. 4 and 5 illustrate a transfer bar that is constructed and operates in a manner similar to that shown in FIGS. 1 through 3. However, in these two figures shield assemblies 18 are mounted on the transfer machine at fixed locations approximately midway between the successive stations. Each shield assembly 18 consists of a pair of shields 20 straddling the transfer bar and pivotably supported as at 22 on transverse bars 24 fixedly mounted on the base of the transfer machine. Each shield 20 has a horizontal leg 26, a generally vertical leg 28 and an inclined leg 30. Along its free edge leg 30 is provided with a weighted bead 32. The two shields 20 in each pair are spaced apart transversely of the transfer bar so that when the transfer bar is in the lowered position the two beads 32 contact one another and the two angled portions 30 of each shield overlie and cover the upper face of the transfer bar. When the lowered transfer bar is in its intermediate position the two shield assemblies 18 effectively cover the nests 12 and thus prevent the chips from the machine M from accumulating within the nests. When the machining operation is completed the transfer bar will complete its remaining half stroke and assume a position wherein the nests are again directly below the workpieces which have been machined. When the transfer bar raises to engage the workpieces the upper edges of the transfer bar will engage the angled portions 30 of shields 20 to pivot them outwardly as shown in FIG. 4. The outward pivotal movement of shields 20 is limited by the abutment of the horizontal portion 26 with the support bars 24. When the transfer bar is advanced to transfer the workpieces to the next downstream stations the shields will be held in light engagement with the transfer bar by the off center force of gravity working on the weighted beads 32. After the transfer bar has delivered the workpiece to the machining station and is lowered, the shields will then swing to the positions shown in FIG. 5 and the transfer bar is again retracted through a half stroke. The macining operations will then be performed on the workpieces.

It will be appreciated that numerous types of drives may be employed for imparting to the transfer bar the above described walking beam motion. One of the mechansims that may be used to accomplish this stroke is shown in FIGS. 12 and 13 of Brems U.S. Pat. No. 3,789,676 and is illustrated diagrammatically herein in FIGS. 6 through 9. In the arrangement illustrated in that patent a gear rack 218 is driven by a crank gear 216 in a manner to produce a desired relationship between acceleration, velocity and dwell. In FIGS. 6 through 9 the transfer bar 10 is illustrated connected to the gear rack 218 for reciprocation axially. Transfer bar 10 is supported by a pair of rollers 34 at the upper ends of pivotally supported levers 36. Levers 36 are connected for pivotal movement in unison by a link 38. The levers are pivoted through a connection with the rod 40 of cylinder 42.

Figure 6:
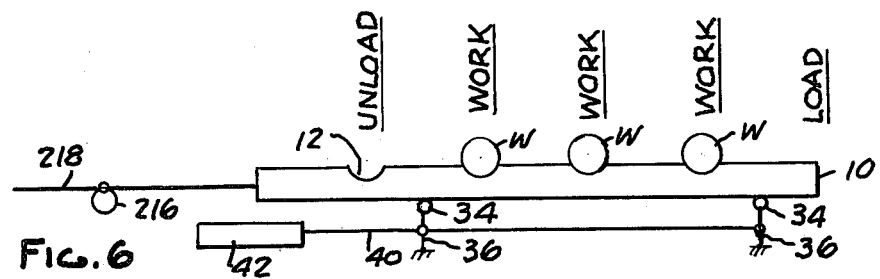
FIGS. 6 through 9 illustrate one type of mechanism that may be used to produce the stroke of the transfer bar in accordance with the present invention.
Figure 7:
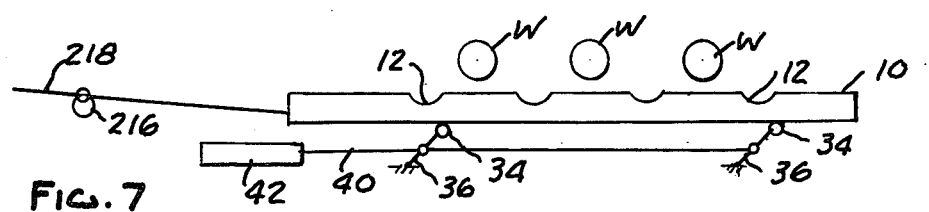
Figure 8:
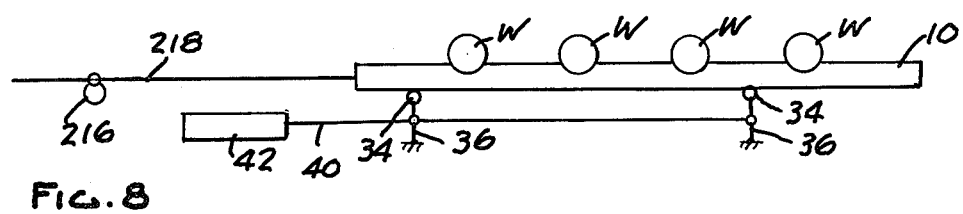
Figure 9:
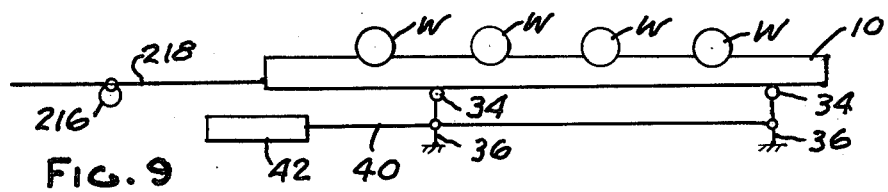

FIG. 6 shows the workpieces W delivered to the machining stations where they have been chucked and are ready for machining. In FIG. 7 the transfer bar 10 has been lowered by extending the rod 40 of cylinder 42 and has been retracted through a half stroke by rotating crank gear 216 through one revolution. With the transfer bar located in the position illustrated in FIG. 7 the workpieces will be machined. After the machining operation is completed the crank gear 216 is rotated through another complete revolution to move the transfer bar to its fully retracted position. Thereafter, cylinder 42 is actuated to pivot levers 36 counterclockwise to the upright position and thereby raise the transfer bar to a position wherein the nests are in line with the workpieces at the machining stations. After the workpieces are engaged with the nests, the crank gear 216 is caused to make two uninterrupted revolutions in the opposite direction and thereby advance the transfer bar and the workpieces carried thereby to the left as shown in FIG. 9 to again locate the workpieces at the machining stations and to locate the forwardmost workpiece at the unload station.

Figure 10:
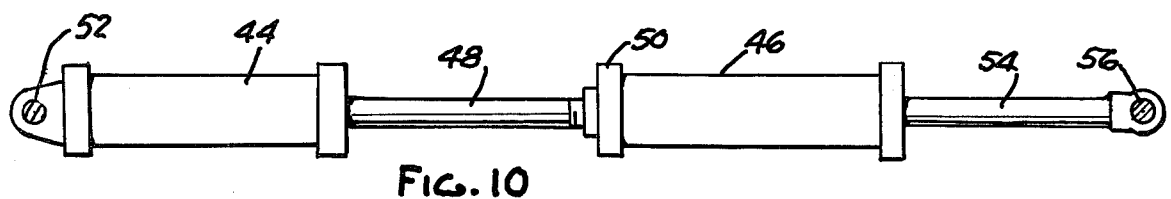
FIGS. 10 and 11 show alternate forms of arrangements for producing a stroke of the transfer bar in accordance with the present invention.

FIG. 10 illustrates another arrangement for shifting the transfer bar through two half strokes. Two cylinders 44,46 are arranged in tandem by threading the rod 48 of cylinder 44 into the end cap 50 of cylinder 46. Cylinder 44 is pivotably connected as at 52 to a fixed support and the rod 54 of cylinder 46 is connected to the transfer bar as at 56. With the arrangement shown in FIG. 10, when it is desired to retract the transfer bar the initial half stroke, one of the cylinders 44,46 is powered. After the machining operation is completed the other cylinder is powered to retract the transfer bar through the remaining half stroke and thus accomplish the full return of the transfer bar. It will be understood that when the transfer bar has been raised and engages the workpieces the forward transfer through the full stroke can be accomplished by powering both cylinders 44,46 simultaneously in the other direction.

Figure 11:
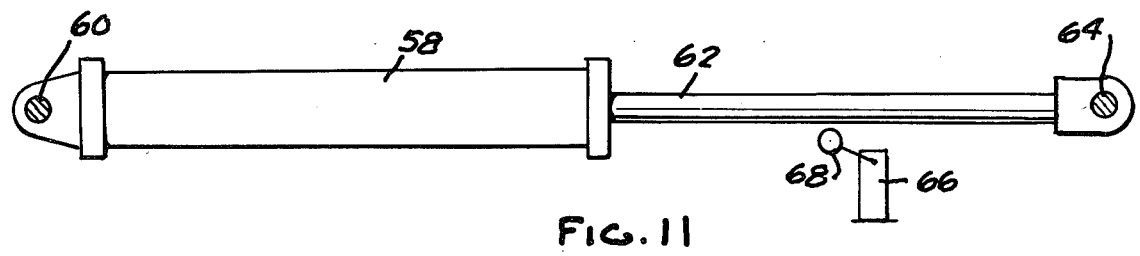

FIG. 11 shows another cylinder arrangement for producing a half stroke return of the transfer bar. In this arrangement a cylinder 58 is pivotably connected to a fixed support as at 60. The rod 62 of the cylinder is connected to the transfer bar as at 64. A contact switch 66 is located in a position at approximately half the stroke of the cylinder. When rod 62 is retracted it will contact switch arm 68 and through the proper circuitry (not illustrated) retraction of the transfer bar will be arrested at mid-stroke. The mid-stroke position of the transfer bar need not be precise and the use of mechanical stops is, therefore, not necessary. The placement of switch 66 need only be such that upon retraction of the transfer bar to the mid position the nests will be located approximately midway between successive machining stations or beneath the shields when shields are employed.

I claim:

1. In a transfer machine which includes a plurality of regularly spaced machining stations and a transfer bar for indexing workpieces through said successive stations, said transfer bar having work carriers thereon spaced to correspond with the spacing between said stations and being reciprocable through advance and retract strokes corresponding in length to the spacing between successive stations to position the workpieces successively at each of said stations, that improvement which comprises, means for arresting movement of the transfer bar at approximately the mid point of its retract stroke to permit machining the workpieces at the stations while the work carriers are located approximately midway between successive stations.

2. The improvement called for in claim 1 wherein the transfer bar is retained at said mid point until the machining operations at said stations are completed.

3. The improvement called for in claim 2 including means for moving the transfer bar from said mid stroke position to the end of its retract stroke.

4. The improvement called for in claim 1 including means for imparting to the workpiece carriers on the transfer bar a generally rectangular walking beam motion, advancing when elevated and retracting when lowered, whereby the transfer bar arresting means are operative when the work carriers are in a lowered position between successive stations.

5. The improvement called for in claim 1 including shields on the transfer machine located approximately midway between a machining station and the next preceding station and adapted to overlie the work carriers when the transfer bar is retracted to said mid position.

6. The improvement called for in claim 5 including means for enabling the work carriers to bypass said shields on the advance stroke of the transfer bar.

7. The improvement called for in claim 5 wherein the shields are movable to and from said position overlying said work carriers.

8. The improvement called for in claim 7 wherein the shields are moved from said position overlying the work carriers to said bypassing position when the transfer bar moves through its advance stroke.

9. In the method of operating a transfer machine of the type having a plurality of regularly spaced machining stations to which workpieces are successively advanced by means of correspondingly regularly spaced work carriers on a transfer bar which is reciprocated through advance and retract strokes which correspond in length with said spacing, the improvement which comprises the steps of arresting movement of the transfer bar at approximately the mid point of its retract stroke to position the work carriers approximately midway between successive stations and machining the workpieces at said stations while the transfer bar is at said mid point position whereby to reduce the tendency for machining chips produced at said stations from being deposited on said work carriers.

10. The method called for in claim 9 including the step of completing the retraction stroke of the transfer bar after the machining operations at said stations are completed.

11. The method called for in claim 10 wherein the work carriers are reciprocated in a generally rectangular walking beam motion, being advanced when in raised position and retracted when in lowered position.

12. The method called for in claim 11 wherein movable shields are adapted to overlie the work carriers when the transfer bar is at said mid point of its retraction stroke and including the step of moving said shields from said position overlying the work carriers to a position bypassing the work carriers when the transfer bar is shifted from its lowered to its raised position.

* * * * *